(12) United States Patent
Su et al.

(10) Patent No.: US 12,209,429 B2
(45) Date of Patent: Jan. 28, 2025

(54) FULLDOME DISPLAY FRAMEWORK WITH MOVABLE ASSEMBLY

(71) Applicant: Brogent Technologies Inc., Kaohsiung (TW)

(72) Inventors: Pei-Te Su, Kaohsiung (TW); Kuan-Chih Liu, Kaohsiung (TW); Tak-Hon Lee, Kaohsiung (TW)

(73) Assignee: BROGENT TECHNOLOGIES INC., Kaohsiung (TW)

( * ) Notice: Subject to any disclaimer, the term of this patent is extended or adjusted under 35 U.S.C. 154(b) by 89 days.

(21) Appl. No.: 17/984,604

(22) Filed: Nov. 10, 2022

(65) Prior Publication Data

US 2023/0183993 A1 Jun. 15, 2023

(30) Foreign Application Priority Data

Dec. 15, 2021 (TW) ................................. 110147008

(51) Int. Cl.
  *E04H 3/22* (2006.01)
(52) U.S. Cl.
  CPC ..................................... *E04H 3/22* (2013.01)
(58) Field of Classification Search
  CPC .. E04H 3/28; E04H 3/123; E04H 3/24; E04H 3/26; E04H 3/22; A63J 1/00
  See application file for complete search history.

(56) References Cited

U.S. PATENT DOCUMENTS 3,282,363 A * 11/1966 Curra, Jr. ................ E04H 3/123
                                                      52/10
4,934,113 A * 6/1990 Hall ........................ E04H 3/28
                                                      52/143

(Continued)

FOREIGN PATENT DOCUMENTS

CN   108211384 A     6/2018
CN   113756616 A  *  6/2020

(Continued)

OTHER PUBLICATIONS

STAGEDROP IntelliStage Lightweight 4'×8' Half-Circle Portable Stage Add-on (https://web.archive.org/web/20210923212540/https://www.stagedrop.com/portable-staging/Intellistage/SDR48-4x8-round-half-circle-portable-stage-add-on, Sep. 23, 2021).*

(Continued)

*Primary Examiner* — Brian E Glessner
*Assistant Examiner* — Daniel J Kenny
(74) *Attorney, Agent, or Firm* — Birch, Stewart, Kolasch & Birch, LLP

(57) ABSTRACT

A fulldome display framework with a movable assembly adapted to dispose a plurality of display screens or projection screens to constitute a fulldome display includes a fixed frame engaged with a base surface and a movable frame disposed on the base surface and being movable relative to the fixed frame between an assembling position and a disassembling position along a predetermined route. The fulldome display is constituted when the movable frame is located at the assembling position to match with the fixed frame. In this way, after an LED fulldome display structure is installed on the present invention for example, the movable frame could be pulled out relative to the fixed frame along the predetermined route when a circuit board of a part of the fulldome display requires to be repaired, providing a certain working area for a repair worker to carry out repair and maintenance.

9 Claims, 12 Drawing Sheets

(56) References Cited

U.S. PATENT DOCUMENTS

| | | | | |
|---|---|---|---|---|
| 5,117,596 | A | * 6/1992 | Leslie | E04F 15/04 |
| | | | | 52/223.7 |
| 6,581,339 | B2 | * 6/2003 | Thiede | E04H 3/24 |
| | | | | 407/7 |
| 7,703,401 | B2 | * 4/2010 | Davis | E04H 3/28 |
| | | | | 108/156 |
| 7,716,895 | B2 | * 5/2010 | Fairorth | E04H 3/28 |
| | | | | 472/75 |
| 10,860,843 | B1 | 12/2020 | Berme et al. | |
| 11,487,195 | B2 | * 11/2022 | Tamura | G03B 21/58 |
| 2021/0240067 | A1 | 8/2021 | Tamura | |

FOREIGN PATENT DOCUMENTS

| | | | |
|---|---|---|---|
| GB | 2475505 | * | 11/2009 |
| JP | 2018-77346 A | | 5/2018 |
| TW | 202020550 A | | 6/2020 |

OTHER PUBLICATIONS

Taiwanese Search Report dated May 18, 2022 for Application No. 110147008 with an English translation.

* cited by examiner

FULLDOME DISPLAY FRAMEWORK WITH MOVABLE ASSEMBLY

BACKGROUND OF THE INVENTION

Technical Field

The present invention relates generally to a framing apparatus, and more particularly to a fulldome display framework with a movable assembly.

Description of Related Art

A conventional cinema system of virtual reality provides audiences with the visual feeling of virtual reality by projecting an image on a projection screen of a fulldome display or playing an image via a light-emitting diode (LED) fulldome display structure. The fulldome display is constructed by disposing a part of the projection screen or a part of an LED display on a frame of the fulldome display to constitute a display area that is a semi-spherical shape.

When the fulldome display is under repair, for example repairing a south pole region of a bottom side of the LED fulldome display, a repair worker is required to lie prone on an LED circuit board to repair as no position is provided for the repair worker to stand, thereby the repair process is difficult and may cause the risk of damaging LEDs. Therefore, the conventional cinema system still has room for improvements, so that the repair worker could access to a repair region when the fulldome display is installed, and a framing structure having a certain operating space could be provided, solving the difficulty of the repair worker encountered during repair and maintenance.

BRIEF SUMMARY OF THE INVENTION

In view of the above, the primary objective of the present invention is to provide a framing structure including a fixed frame and a movable frame that could move relative to the fixed frame, wherein a repair region adapted to serve as an operating space of the repair worker appears after the movable frame and the fixed frame are separated by a distance, which is conducive to repair a fulldome display disposed on the fixed frame or the movable frame.

The present invention provides a fulldome display framework with a movable assembly adapted to dispose a plurality of display screens or projection screens to constitute a fulldome display and including a fixed frame fixed on a base surface and a movable frame disposed on the base surface and being movable relative to the fixed frame between an assembling position and a disassembling position along a predetermined route.

In practice, two parts of the fulldome display are respectively disposed on the fixed frame and the movable frame. When the fulldome display is required to be repaired or maintained, the movable frame is moved outwards relative to the fixed frame along the predetermined route, creating a space serving as a working area between the movable frame and the fixed frame.

When repairing or maintaining the fulldome display installed on the present invention, the repair worker could access to the part of the fulldome display that requires repair via the working area instead of lying prone on a frame for repairing, thereby preventing the LED circuit board of the fulldome display from damaging. Additionally, when the movable frame of the present invention is divided into a plurality of framing assemblies, each part of the fulldome display could be correspondingly fitted to one of the framing assemblies at the factory in advance, and the framing assemblies and the parts of the fulldome display are integrally moved to the base surface of the place for installing, thereby the fulldome display would have a greater smoothness.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
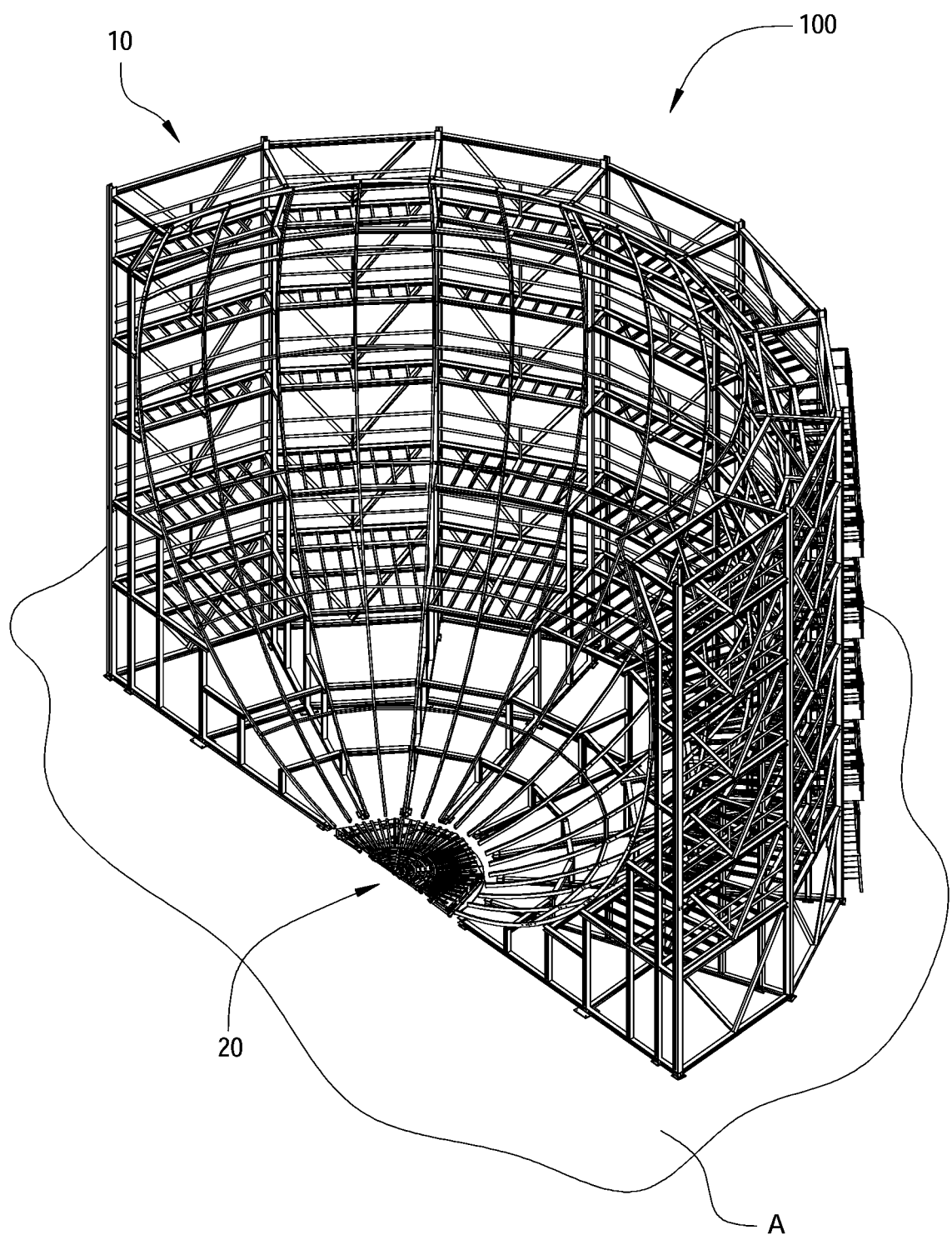
FIG. 1 is a perspective view of the fulldome display framework with the movable assembly according to a first embodiment of the present invention.
Figure 2:
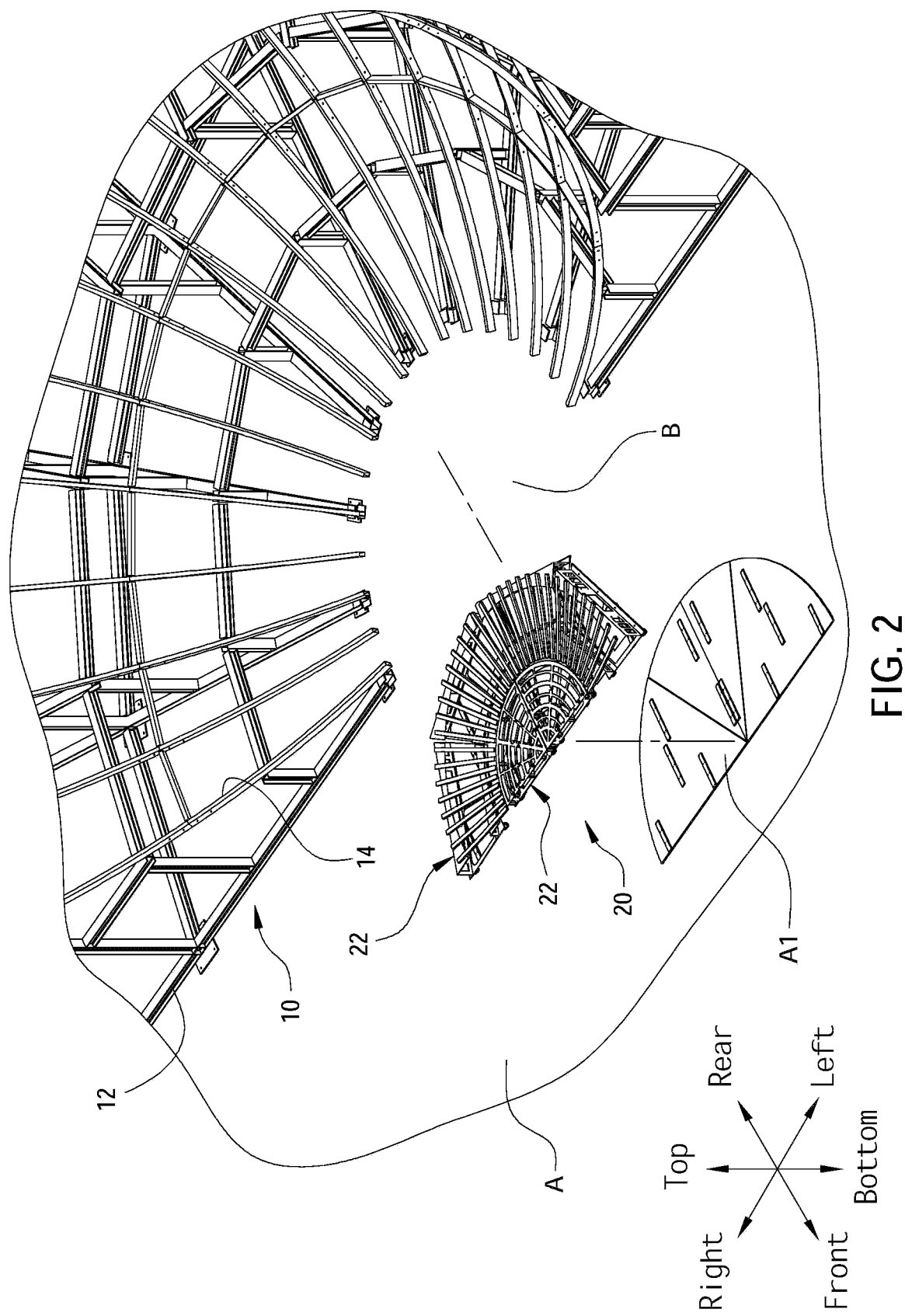
FIG. 2 is an enlarged schematic view, showing a part of the fulldome display framework with the movable assembly according to the first embodiment of the present invention is exploded.
Figure 3:
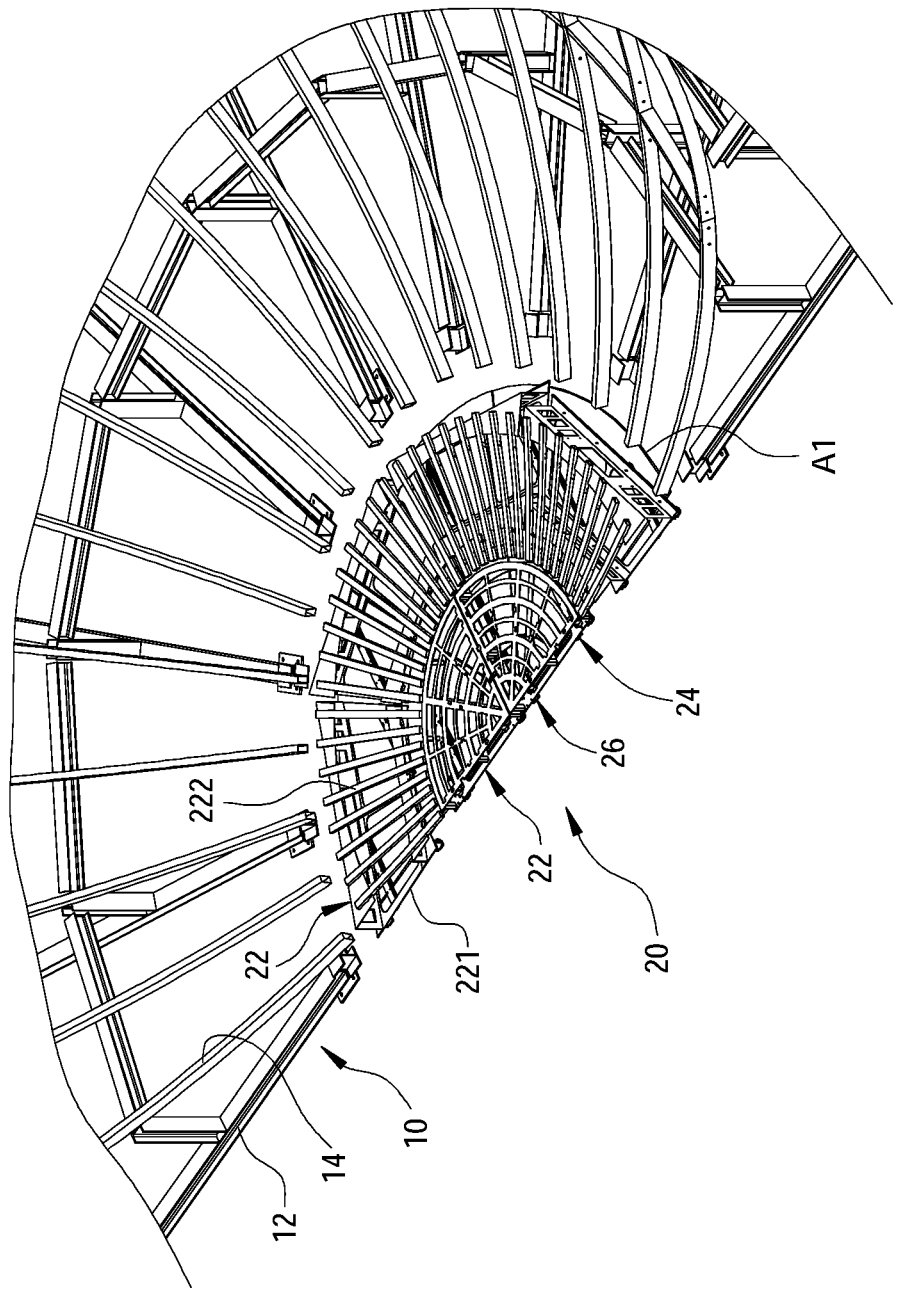
FIG. 3 is an enlarged schematic view of a part of the of the fulldome display framework with the movable assembly according to the first embodiment of the present invention.
Figure 4:
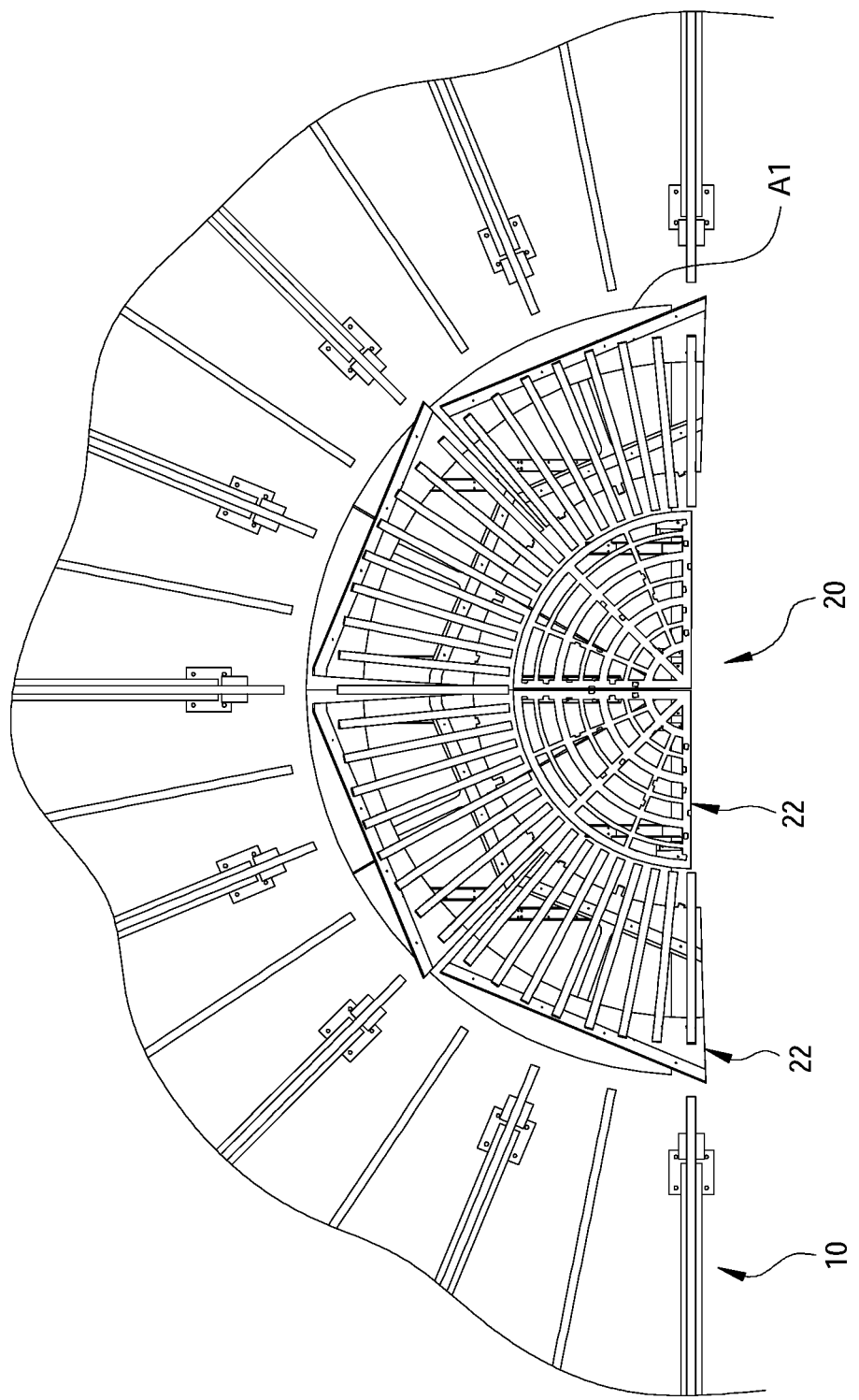
FIG. 4 is a top view of a part of the fulldome display framework with the movable assembly according to the first embodiment of the present invention.
Figure 5:
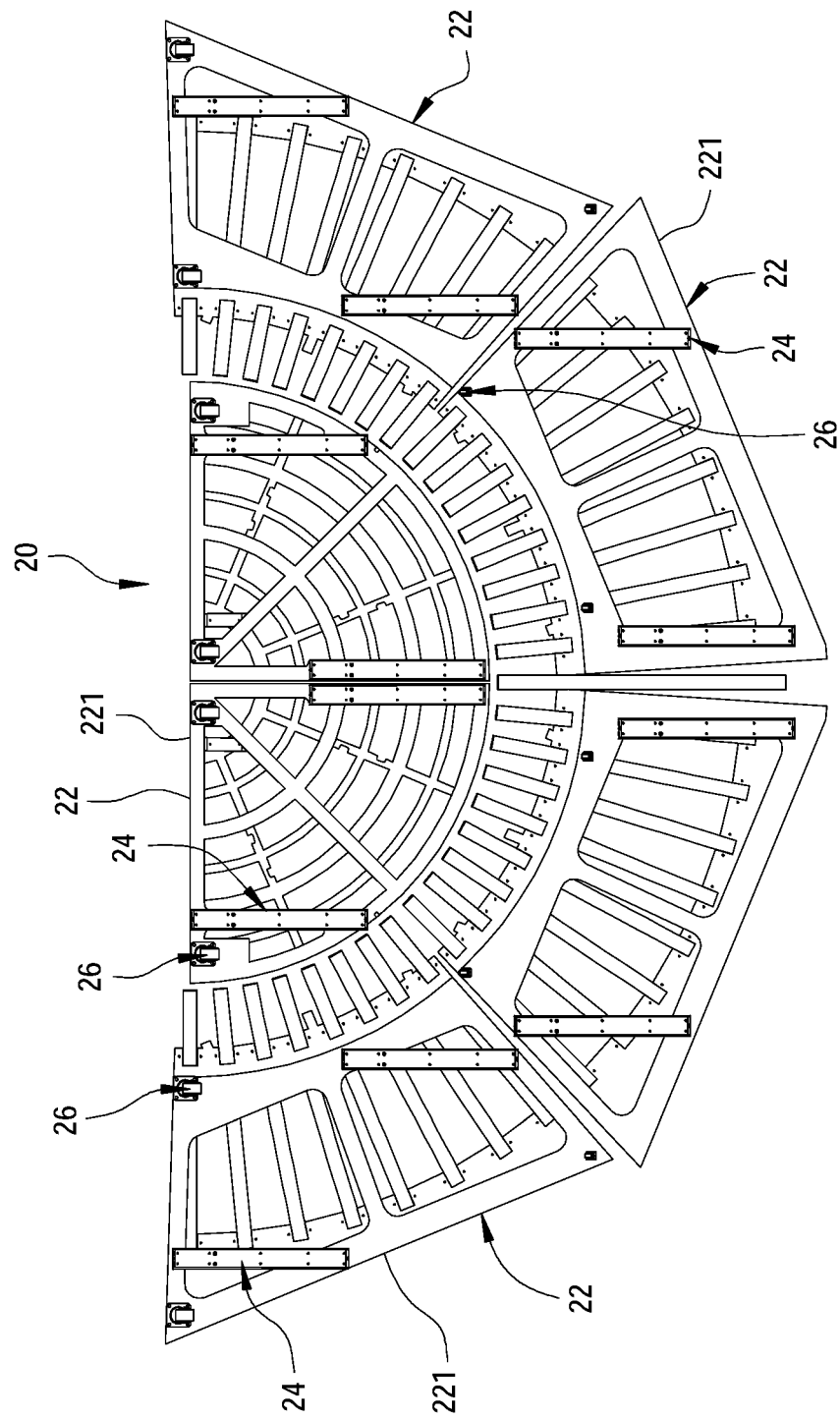
FIG. 5 is a top view of the movable frame of the fulldome display framework with the movable assembly according to the first embodiment of the present invention.

In the description below, the terms "top", "bottom", "front", "rear", "left", "right", and their derivatives, should be interpreted from the exploded view of the present invention in FIG. 2. It is also understood that the terminology used herein is for the purpose of describing particular embodiments only, and is not intended to limit the scope of the present invention. A fulldome display framework with a movable assembly 100 according to a first embodiment of the present invention is illustrated in FIG. 1 to FIG. 7 and includes a base surface A, a fixed frame 10 engaged with the base surface A, and a movable frame 20 disposed on the base surface A. In the current embodiment, the fixed frame 10 is a frame in which an inner surface of the frame is a semi-spherical shape, and a south pole region of a bottom side of the fixed frame 10 has an accommodating space B, wherein the movable frame 20 is located in the accommodating space B.

In the current embodiment, the movable frame 20 is a frame that is a semi-circular shape and is movable relative to the fixed frame 10 between an assembling position and a disassembling position along a predetermined route on the base surface A. The fixed frame 10 and the movable frame 20 are respectively adapted to dispose a part of a fulldome display. When the movable frame 20 is located at the assembling position, the part of the fulldome display disposed on the movable frame 20 matches with the part of the fulldome display disposed on the fixed frame 10 to constitute the fulldome display.

In the first embodiment, the fixed frame 10 is the frame in which the inner surface of the frame is the semi-spherical shape, and the movable frame 20 is the semi-circular frame. However, in other embodiments, depending on a shape of the fulldome display disposed on the present invention, the fixed frame 10 could be a frame in which an inner surface of the frame is a partially spherical surface and the movable frame 20 could be a frame in which a surface of the frame is a partially spherical surface, and the two parts of the fulldome display are respectively disposed on the fixed frame 10 and the movable frame 20, thereby the entire fulldome display could be constituted when the movable frame 20 is located at the assembling position.

In practice, a part of a light-emitting diode (LED) display of the fulldome display could be respectively disposed on the fixed frame 10 and the movable frame 20. When repairing or maintaining the fulldome display installed on the present invention, the movable frame 20 could be moved outwards relative to the fixed frame 10 along the predetermined route, creating a space served as a working area C between the movable frame 20 and the fixed frame 10, so that at that time a repair worker could access to an LED circuit board that requires to be repaired via the working area C, which also provides the repair worker with a manipulating space for repairing and maintaining. In this way, it is convenient for the repair worker to carry out repair and maintenance works and prevents the LED circuit board from being damaged by the repair worker during repair and maintenance.

As shown in FIG. 2 to FIG. 7, the fixed frame 10 has a bottom frame 12 and a fulldome display frame 14 and is fixed on the base surface A, wherein the fulldome display frame 14 of the fixed frame 10 is connected to an inner side of the bottom frame 12 of the fixed frame 10 and is supported by the bottom frame 12 of the fixed frame 10, and a substrate A1 is disposed at a position of the base surface A corresponding to the movable frame 20. A south pole portion of the fulldome display is divided into six pieces to match with the accommodating space B of the south pole region of the fixed frame 10 that is divided into six regions, and the movable frame 20 is modularized into six framing assemblies 22 to match with the six regions. The framing assemblies 22 are disposed on the substrate A1 and respectively have a bottom frame 221 and a fulldome display frame 222, wherein the fulldome display frame 222 of the framing assemblies 22 is engaged with a top of the bottom frame 221 of the framing assemblies 22 and is supported by the bottom frame 221 of the framing assemblies 22.

A bottom of each of the framing assemblies 22 is engaged with at least one rail 24. In the current embodiment, the bottom of each of the framing assemblies 22 is engaged with two rails 24 spaced along a left-right direction, wherein each of the rails 24 is a track extending along a front-rear direction and includes a fixed rail 241 and a movable rail 242 slidably disposed on the fixed rail 241. The fixed rail 241 is engaged with the substrate A1, and the movable rail 242 is engaged with each of the framing assemblies 22. The rails 24 are respectively engaged between the framing assemblies 22 and the base surface A, and the rails 24 extend along the predetermined route. In the current embodiment, the predetermined route is straight, thereby the framing assemblies 22 could move straight relative to the fixed frame 10 in the front-rear direction. More specifically, the framing assemblies 22 could move within a certain distance between a starting state and an extending limit of each of the rails 24 along the linear predetermined route.

Figure 6:
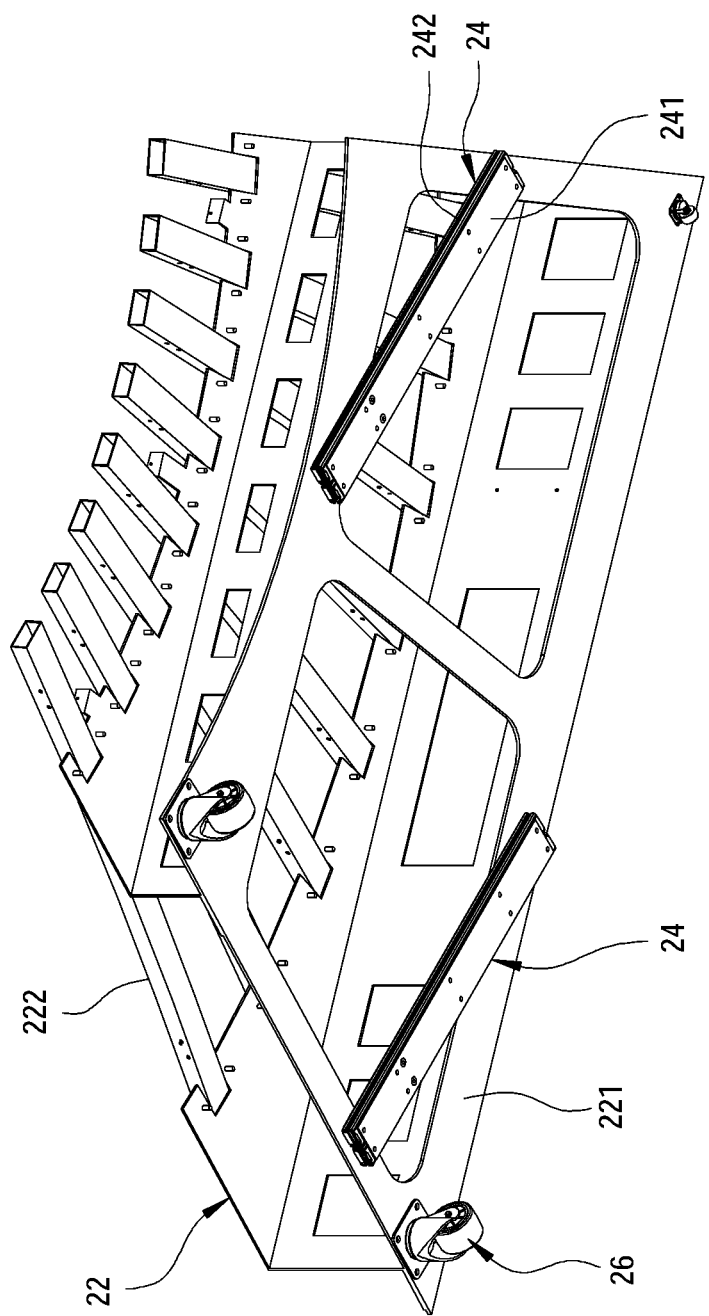
FIG. 6 is a perspective view of one of the movable assemblies of the fulldome display framework with the movable assembly according to the first embodiment of the present invention.
Figure 7:
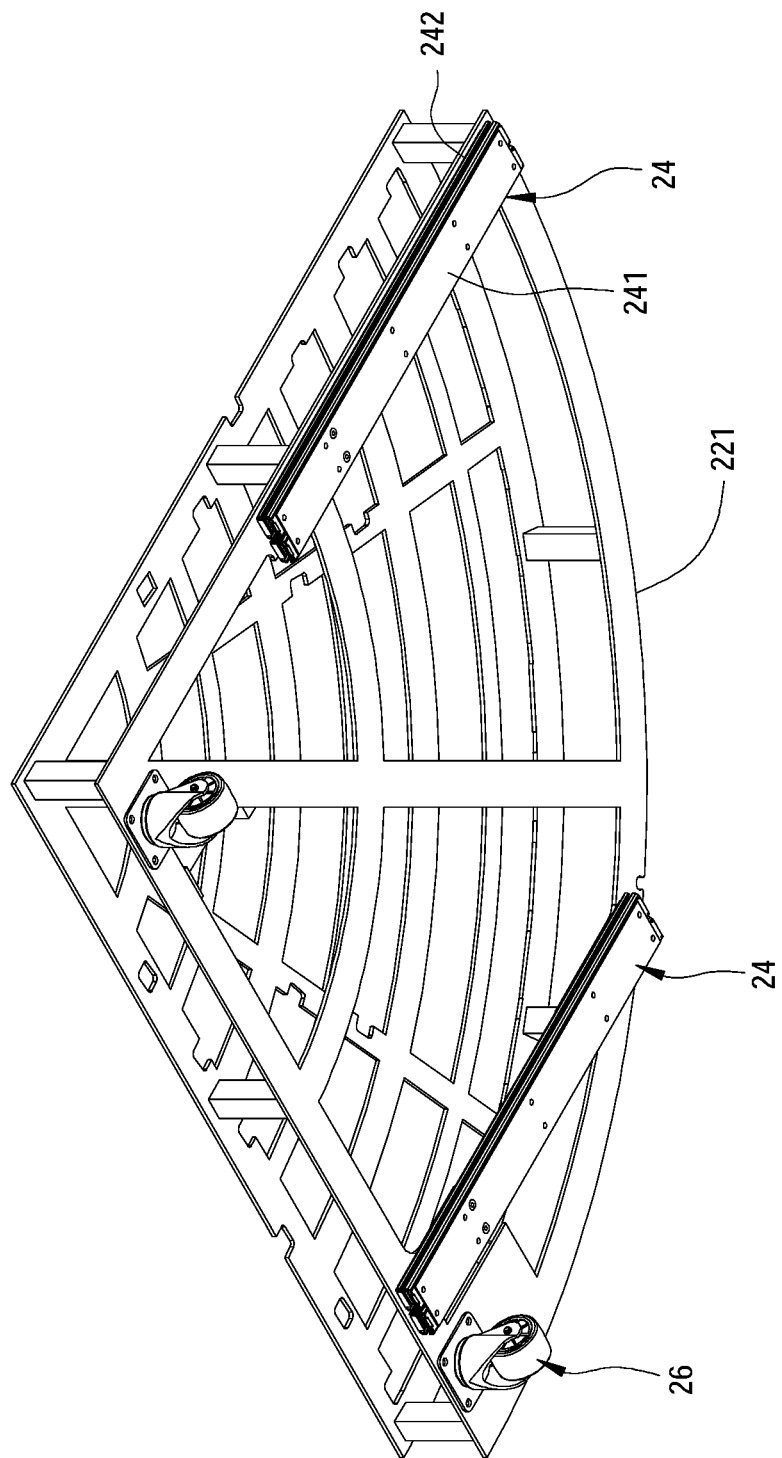
FIG. 7 is a perspective view of another one of the movable assemblies of the fulldome display framework with the movable assembly according to the first embodiment of the present invention.
Figure 8:
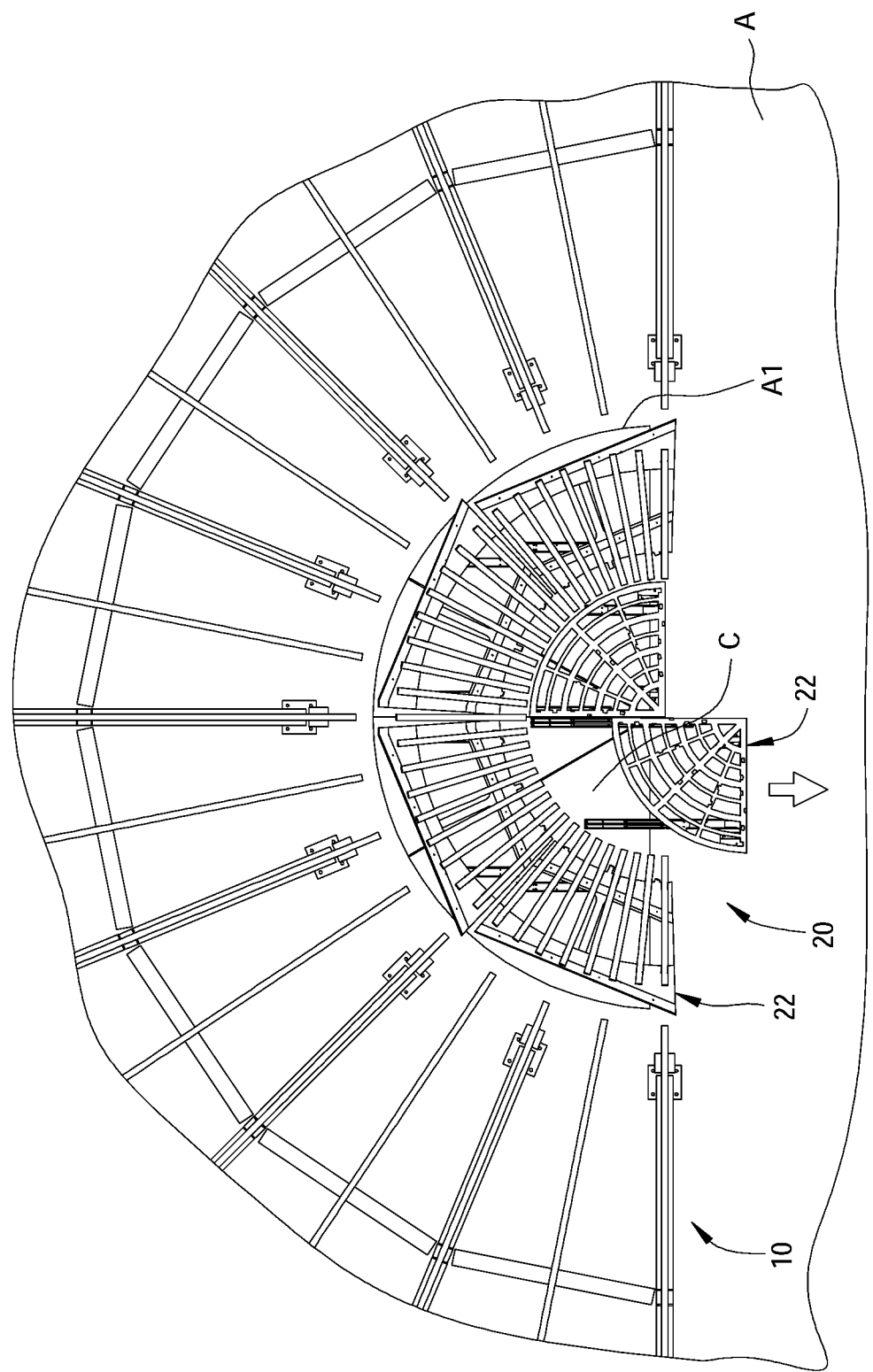
FIG. 8 is a schematic view showing one of the framing assemblies being moved out.
Figure 9:
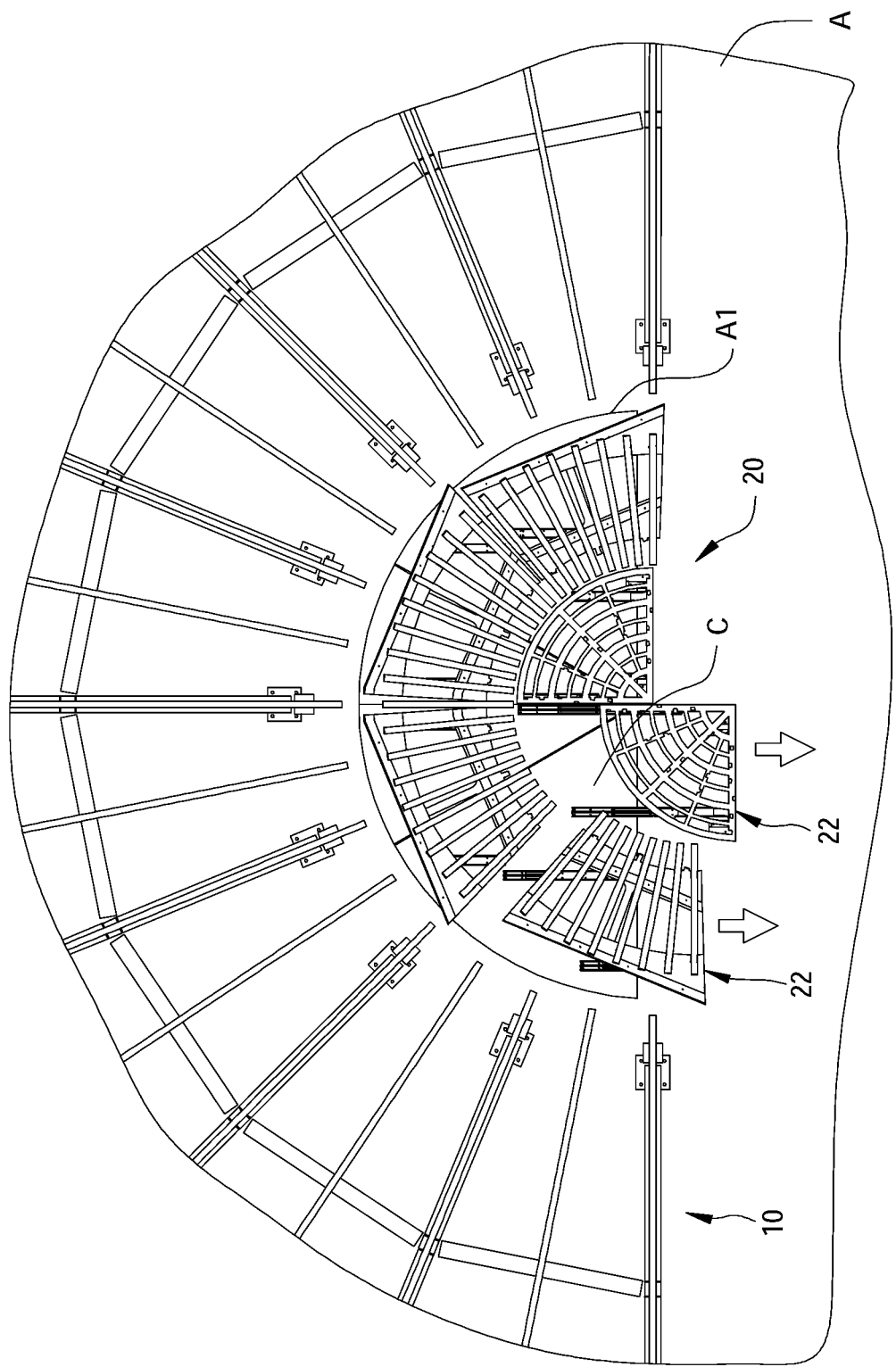
FIG. 9 is similar to FIG. 8, showing two of the framing assemblies being moved out.

In order to provide a better support to the framing assemblies 22 of the movable frame 20 and allow the framing assemblies 22 to move more smoothly on the base surface A or the substrate A1, two rails 24 disposed on the bottom of each of the framing assemblies 22 are arranged in a staggered arrangement in the predetermined route, so that a weight of each of the framing assemblies 22 could be shared by the rails 24 disposed in a wider range, thereby providing a better support to the framing assemblies 22. At least one wheel 26 is disposed on a position of the bottom of each of the framing assemblies 22 in which the two rails are not disposed, thereby to work with the two rails 24. Referring to FIG. 6 and FIG. 7, in the current embodiment, a left position and a right position of a front side of the bottom of each of the framing assemblies 22 are respectively engaged with a wheel 26, thereby each of the framing assemblies 22 is supported by the two rails 24 on a rear side of the bottom of each of the framing assemblies 22 and the two wheels 26 on the front side of the bottom of each of the framing assemblies 22.

Referring to FIG. 6 to FIG. 9, when the present invention is under repair and maintenance, one or at least two of the framing assemblies 22 of the movable frame 20 could be pulled outwards along the predetermined route, creating the working area C between one of the framing assemblies 22 and the fixed frame 10 or between the two framing assemblies 22 that are adjacent in the front-rear direction, thereby convenient for the repair worker to access to the LED circuit board for cleaning or repairing and maintaining. In the current embodiment, each of the rails 24 is a damping slide, thereby by simply pushing each of the framing assemblies 22 to a region close to the assembling position, a retraction function of the rails 24 could enable each of the frame assemblies 22 to automatically move along the predetermined route to be restored to the assembling position. Each of the wheels 26 is a wheel having a brake, thereby each of the framing assemblies 22 could be positioned at the assembling position via a braking function of the wheels 26, and after each of the framing assemblies 22 is moved outwards relative to the fixed frame 10 along the predetermined route, a position of each of the framing assemblies 22 could be fixed at the disassembling position via the braking function of the wheels 26, ensuring that each of the framing assemblies 22 would not restore to the assembling position while the repair worker is manipulating in a repair region and thereby increasing the safety of repair, maintenance, and manipulation.

Figure 10:
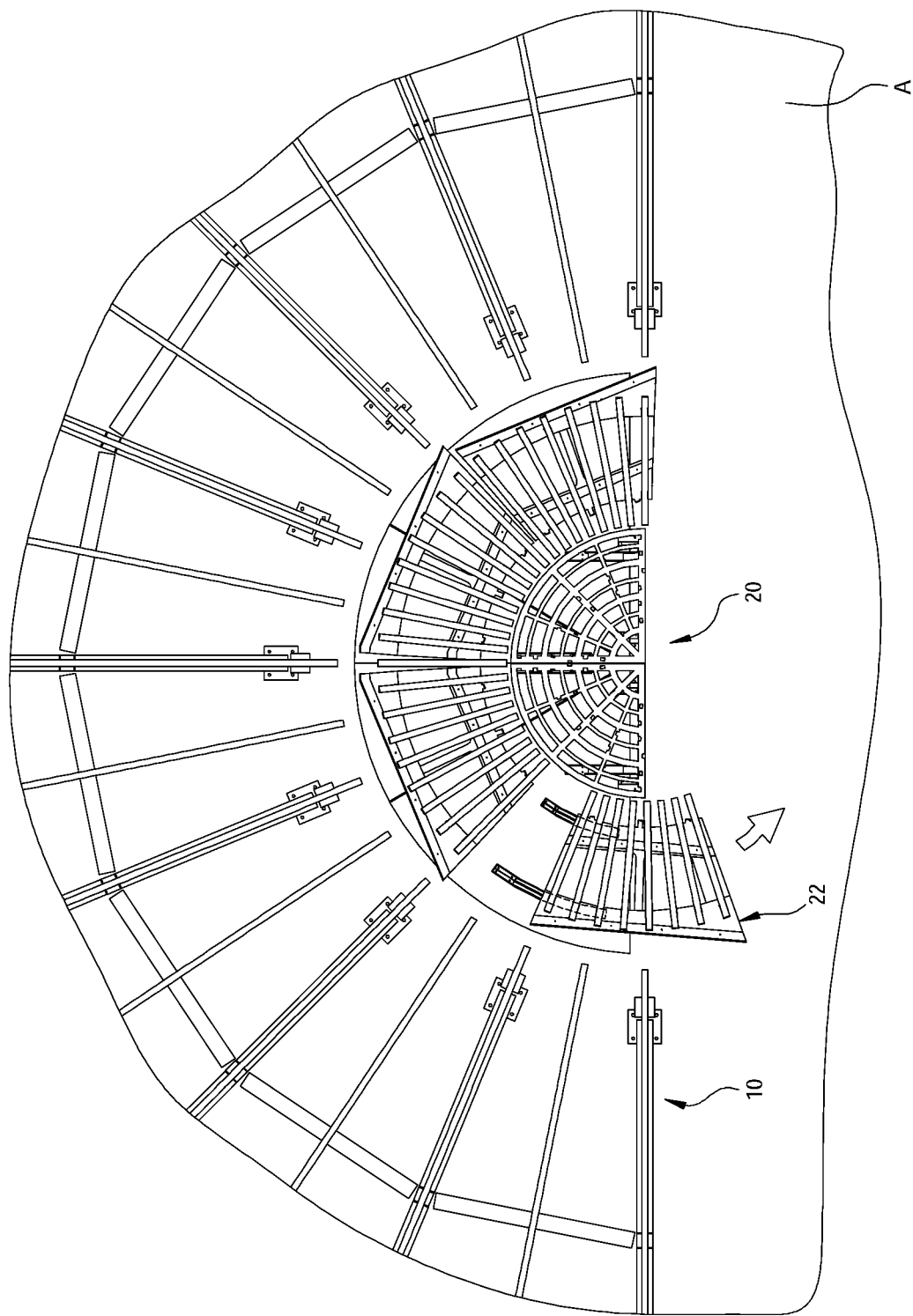
FIG. 10 is a schematic view of the fulldome display framework with the movable assembly according to a second embodiment of the present invention, showing one of the framing assemblies being moved out.

However, the number of the framing assembly 22 is not limited to the example given above, but could be one or more than two in other embodiments, and the predetermined route is not limited to be a straight route either. A fulldome display framework with a movable assembly according to a second embodiment of the present invention is illustrated in FIG. 10, wherein the framing assemblies 22 of the movable frame 20 could turn to move relative to the fixed frame 10 along a predetermined route that is an arced shaped on the base surface A.

Figure 11:
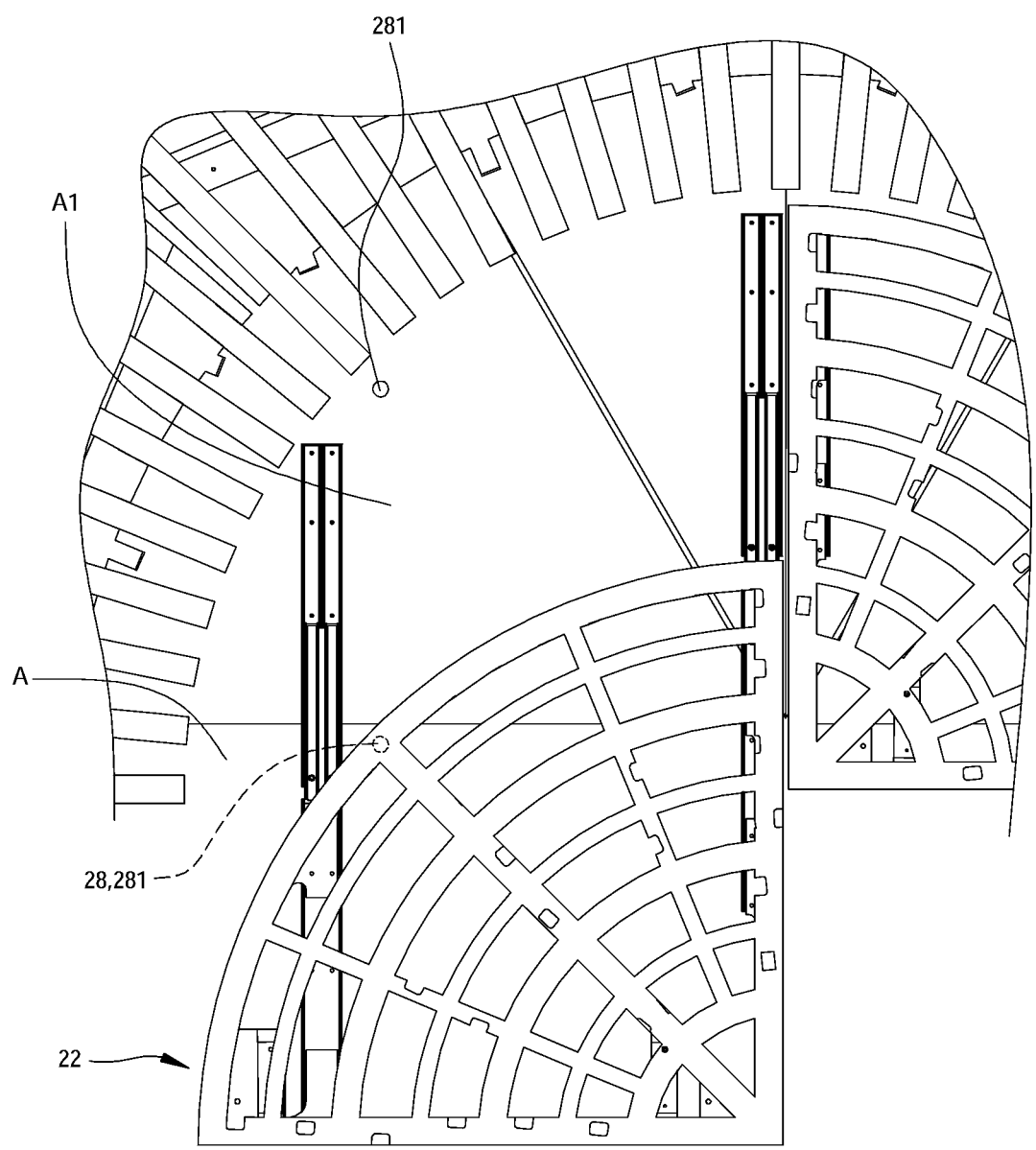
FIG. 11 is an enlarged schematic view of the fulldome display framework with the movable assembly according to an embodiment of the present invention, showing one of the framing assemblies being moved out.

Apart from the first embodiment and the second embodiment, in which each of the framing assemblies 22 is fixed at the assembling position or the disassembling position via the braking function of the wheels 26, in an embodiment shown in FIG. 11, each of the framing assemblies 22 is engaged with a first magnet 28, and the base surface A is engaged with two second magnets 281 respectively matching with the first magnet 28 when each of the framing assemblies 22 is located at the assembling position or the disassembling position. Each of the framing assemblies 22 could be positioned at the assembling position through the first magnet 28 magnetically attracted by one of the second magnet 281 before each of the framing assemblies 22 is moved or at the disassembling position through the first magnet 28 magnetically attracted by the other second magnet 281 after each of the framing assemblies is moved.

Figure 12:
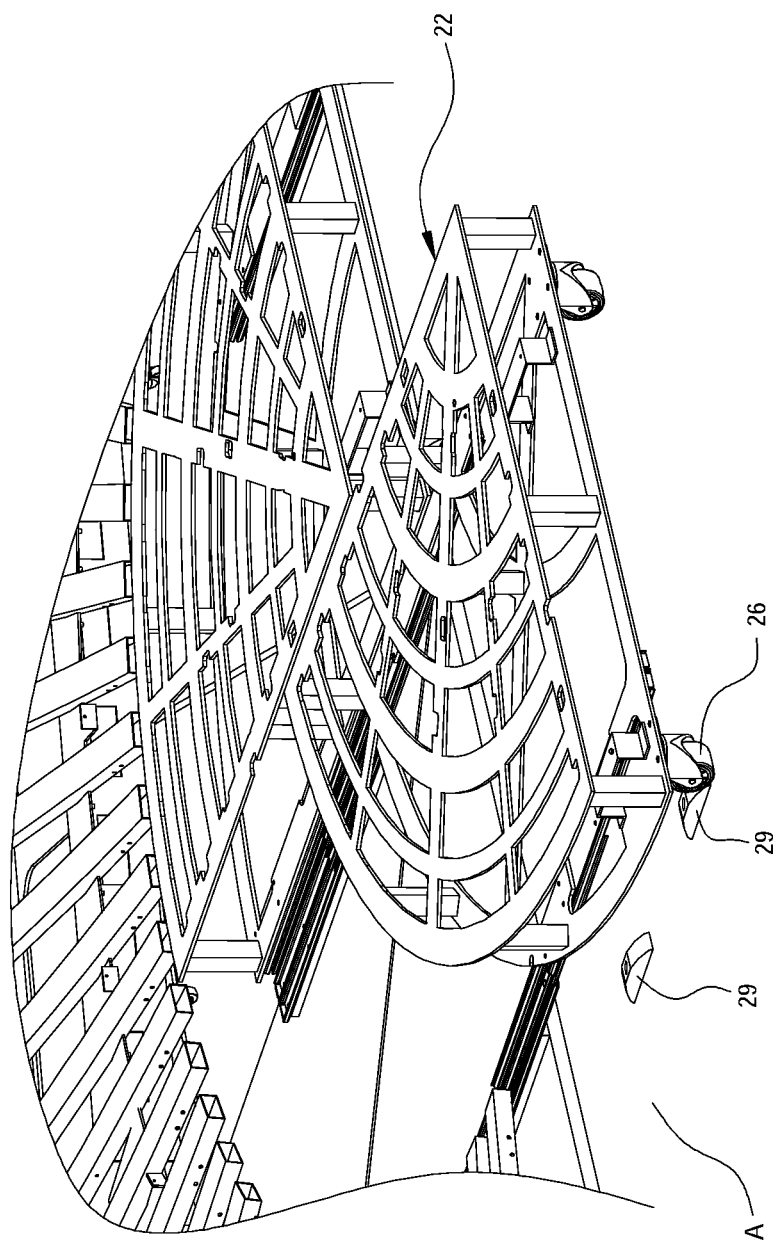
FIG. 12 is an enlarged schematic view of the fulldome display framework with the movable assembly according to another embodiment of the present invention, showing one of the framing assemblies being moved out.

Another embodiment of the present invention is illustrated in FIG. 12, wherein the base surface A is engaged with two stop blocks 29 respectively matching with the wheel 26 when each of the framing assemblies 22 is located at the assembling position or the disassembling position. When each of the framing assemblies 22 is located at the assembling position, the wheel 26 is located at a position stopped by one of the stop blocks 29 for positioning each of the framing assemblies 22; when each of the framing assemblies 22 is moved to the disassembling position, the wheel 26 would pass through one of the stop block 29 and be stopped by the other stop block 29 to position each of the framing assemblies 22 at the disassembling position. With the aforementioned design, the framing assemblies 22 could be respectively positioned at the assembling position or the disassembling position as well.

It must be pointed out that the embodiments described above are only some preferred embodiments of the present invention. All equivalent structures which employ the concepts disclosed in this specification and the appended claims should fall within the scope of the present invention.

What is claimed is:

1. A fulldome display framework with a movable assembly adapted to accumulate a plurality of display screens or projection screens to constitute a fulldome display, comprising:
a fixed frame fixed on a base surface; and
a movable frame disposed on the base surface and being movable relative to the fixed frame between an assembling position and a disassembling position along a predetermined route;
wherein the fixed frame has a bottom frame and a fulldome display frame supported by the bottom frame of the fixed frame; the movable frame comprises at least one framing assembly having a bottom frame and a fulldome display frame supported by the bottom frame of the at least one framing assembly;
wherein the at least one framing assembly moves relative to the fixed frame within a predetermined distance along the predetermined route that is straight;
wherein at least one rail is engaged between the at least one framing assembly and the base surface, and the at least one rail extends along the predetermined route; the at least one rail includes two rails arranged in a staggered arrangement in the predetermined route; the two rails are engaged with a side of a bottom of the at least one framing assembly, and another side of the bottom of the at least one framing assembly is engaged with at least one wheel; a substrate is disposed at a position of the base surface corresponding to the movable frame; each of the two rails comprises a fixed rail and a movable rail slidably disposed on the fixed rail; the fixed rail is engaged with the substrate, and the movable rail is engaged with the at least one framing assembly.

2. The fulldome display framework as claimed in claim 1, wherein the fixed frame is a frame in which an inner surface of the frame is a semi-spherical shape, and a south pole region of a bottom side of the fixed frame has an accommodating space; the movable frame is a frame that is a semi-circular shape and is located in the accommodating space.

3. The fulldome display framework as claimed in claim 1, wherein the at least one wheel is a wheel having a brake, and the at least one framing assembly is positioned at the assembling position or the disassembling position via the brake function of the at least one wheel; the at least one framing assembly has a first magnet, and the base surface is engaged with two second magnets respectively matching with the first magnet when the at least one framing assembly is located at the assembling position or the disassembling position; the at least one framing assembly is positioned at the assembling position through the first magnet magnetically attracted by one of the second magnets or at the disassembling position through the first magnet magnetically attracted by the other second magnet.

4. The fulldome display framework as claimed in claim 1, wherein the at least one wheel is a wheel having a brake, and the at least one framing assembly is positioned at the assembling position or the disassembling position via the brake function of the at least one wheel; the base surface is engaged with two stop blocks respectively matching with the at least one wheel when the at least one framing assembly is located at the assembling position or the disassembling position; the at least one wheel is located at a position stopped by one of the stop blocks or passes through one of the stop blocks to be stopped by the other stop block to position the at least one framing assembly at the assembling position or the disassembling position.

5. A fulldome display framework with a movable assembly adapted to accumulate a plurality of display screens or projection screens to constitute a fulldome display, comprising:
a fixed frame fixed on a base surface; and
a movable frame disposed on the base surface and being movable relative to the fixed frame between an assembling position and a disassembling position along a predetermined route;
wherein the fixed frame has a bottom frame and a fulldome display frame supported by the bottom frame of the fixed frame; the movable frame comprises at least one framing assembly having a bottom frame and a fulldome display frame supported by the bottom frame of the at least one framing assembly;
wherein at least one rail is engaged between the at least one framing assembly and the base surface, and the at least one rail extends along the predetermined route;
wherein the at least one rail is engaged with a side of a bottom of the at least one framing assembly, and another side of the bottom of the at least one framing assembly is engaged with at least one wheel.

6. The fulldome display framework as claimed in claim 5, wherein the at least one wheel is a wheel having a brake, and the at least one framing assembly is positioned at the assembling position or the disassembling position via the brake of the at least one wheel.

7. The fulldome display framework as claimed in claim 5, wherein the at least one framing assembly has a first magnet, and the base surface is engaged with two second magnets respectively matching with the first magnet when the at least one framing assembly is located at the assembling position or the disassembling position; the at least one framing assembly is positioned at the assembling position through the first magnet magnetically attracted by one of the second magnets or at the disassembling position through the first magnet magnetically attracted by the other second magnet.

8. The fulldome display framework as claimed in claim 5, wherein the base surface is engaged with two stop blocks respectively matching with the at least one wheel when the at least one framing assembly is located at the assembling position or the disassembling position; the at least one wheel is located at a position stopped by one of the stop blocks or passes through one of the stop blocks to be stopped by the other stop block to position the at least one framing assembly at the assembling position or the disassembling position.

9. A fulldome display framework with a movable assembly adapted to accumulate a plurality of display screens or projection screens to constitute a fulldome display, comprising:
a fixed frame fixed on a base surface; and
a movable frame disposed on the base surface and being movable relative to the fixed frame between an assembling position and a disassembling position along a predetermined route;
wherein the fixed frame has a bottom frame and a fulldome display frame supported by the bottom frame of the fixed frame; the movable frame comprises at least one framing assembly having a bottom frame and a fulldome display frame supported by the bottom frame of the at least one framing assembly;
wherein at least one rail is engaged between the at least one framing assembly and the base surface, and the at least one rail extends along the predetermined route;
wherein a substrate is disposed at a position of the base surface corresponding to the movable frame; the at least one rail comprises a fixed rail and a movable rail slidably disposed on the fixed rail; the fixed rail is engaged with the substrate, and the movable rail is engaged with the at least one framing assembly.

* * * * *